(12) United States Patent
Nishino et al.

(10) Patent No.: US 6,976,041 B2
(45) Date of Patent: Dec. 13, 2005

(54) RECORDING MEDIUM RECORDED WITH PROGRAM FOR DETECTING DATABASE OPERATION TIMING, METHOD OF DETECTING DATABASE OPERATION TIMING, AND APPARATUS FOR DETECTING DATABASE OPERATION TIMING

(75) Inventors: Mitsuhide Nishino, Kawasaki (JP); Hisayuki Enbutsu, Kawasaki (JP); Kazuo Ishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 09/815,036

(22) Filed: Mar. 22, 2001

(65) Prior Publication Data

US 2002/0083086 A1 Jun. 27, 2002

(30) Foreign Application Priority Data

Sep. 22, 2000 (JP) .................................. 2000-288116

(51) Int. Cl.$^7$ ............................................. G06F 17/30
(52) U.S. Cl. ..................... 707/205; 707/203; 707/200
(58) Field of Search ................................ 707/200–205, 707/1, 8, 101

(56) References Cited

U.S. PATENT DOCUMENTS 5,058,002 A * 10/1991 Nakamura et al. .......... 707/205
5,806,065 A * 9/1998 Lomet ........................... 707/8
5,832,491 A * 11/1998 Tatsumi et al. ............. 707/101

FOREIGN PATENT DOCUMENTS

JP 6110743 4/1994

* cited by examiner

Primary Examiner—Charles Rones
Assistant Examiner—Neveen Abel-Jalil
(74) Attorney, Agent, or Firm—Greer, Burns, Crain, Ltd.

(57) ABSTRACT

A recording medium includes a program causing a computer to execute the steps of (a) predicting a data storage condition of a database from a record operation, (b) computing a number of relocatable areas and a number of areas in an expansion direction based on the data storage condition predicted in step (a), and (c) detecting operation timing with respect to the database based on the numbers computed in step (b).

11 Claims, 17 Drawing Sheets

FIG.11

| CASE | RECORD OPERATION TYPE / RECORD ADDITION | RECORD DELETION | RECORD UPDATE | FUTURE PREDICTION |
|---|---|---|---|---|
| CASE 1<br>*RECORD ADDITION AFTER DELETION<br>(DELETED RECORD LENGTH = ADDED RECORD LENGTH) | ○ | ○ | — | NO CHANGE |
| CASE 2<br>*RECORD ADDITION AFTER DELETION<br>(DELETED RECORD LENGTH > ADDED RECORD LENGTH) | ○ | ○ | — | EXPANSION DIRECTION |
| CASE 3<br>*RECORD ADDITION AFTER DELETION<br>(DELETED RECORD LENGTH < ADDED RECORD LENGTH) | ○ | ○ | — | RELOCATABLE |
| CASE 4<br>*RECORD UPDATE<br>(RECORD LENGTH BEFORE UPDATE = UPDATED RECORD LENGTH) | — | — | ○ | NO CHANGE |
| CASE 5<br>*RECORD UPDATE<br>(RECORD LENGTH BEFORE UPDATE > UPDATED RECORD LENGTH) | — | — | ○ | EXPANSION DIRECTION |
| CASE 6<br>*RECORD UPDATE<br>(RECORD LENGTH BEFORE UPDATE < UPDATED RECORD LENGTH) | — | — | ○ | RELOCATABLE |

FIG.12

| | PREDICTION MANAGEMENT INFORMATION (PMI) | | NUMBER OF EXPANSION PAGES / NUMBER OF RELOCATION PAGES | |
|---|---|---|---|---|
| CASE 1 | PMI=10 | NO UPDATE | PMI=10 | NUMBER OF RELOCATION PAGES =+1 |
| CASE 4 | PMI=11 | NO UPDATE | PMI=11 | NUMBER OF EXPANSION PAGES =+1 |
| CASE 2 | PMI=00 | 00→11 | PMI=00 | NUMBER OF EXPANSION PAGES =1 |
| CASE 5 | PMI=10 | NO UPDATE | PMI=10 | NUMBER OF RELOCATION PAGES =+1 |
| CASE 3 | PMI=11 | NO UPDATE | PMI=11 | NUMBER OF EXPANSION PAGES =+1 |
| CASE 6 | PMI=00 | 00→10 | PMI=00 | NUMBER OF RELOCATION PAGES =1 |
| | PMI=10 | NO UPDATE | PMI=10 | NUMBER OF RELOCATION PAGES =+1 |
| | PMI=11 | 11→10 | PMI=11 | NUMBER OF RELOCATION PAGES =NUMBER OF ALL LINKS NUMBER OF EXPANSION PAGES=0 |

FIG.13

| | RATE OF USE OF OVERFLOW PAGES (RU) | PREDICTION MANAGEMENT INFORMATION | | |
|---|---|---|---|---|
| | | INITIAL STATE | RELOCATABLE | EXPANSION DIRECTION |
| RELOCATION TIMING | 70% ≧ RU > 50% | — | RR > 30% | — |
| RELOCATION TIMING | 90% ≧ RU > 70% | — | | — |
| DB EXPANSION TIMING | | — | — | RE > 80% |
| FORCED DB EXPANSION TIMING | RU > 90% | — | — | — |

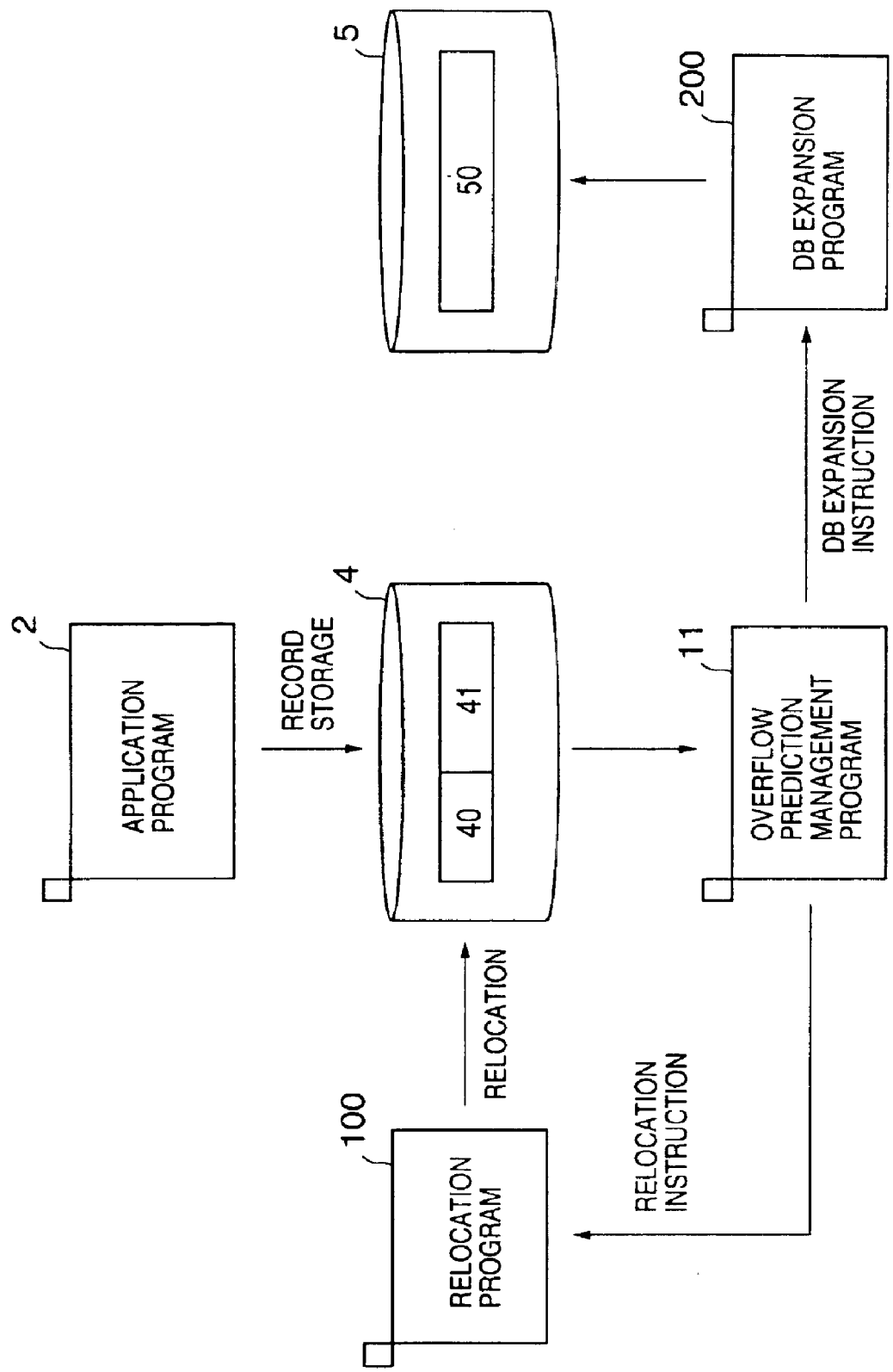

RECORDING MEDIUM RECORDED WITH PROGRAM FOR DETECTING DATABASE OPERATION TIMING, METHOD OF DETECTING DATABASE OPERATION TIMING, AND APPARATUS FOR DETECTING DATABASE OPERATION TIMING

BACKGROUND OF THE INVENTION

1. Field of the Invention

The present invention generally relates to recording media recorded with a program for detecting database operation timing such as timing of performing page relocation in a database or timing of performing the capacity expansion of the database, methods of detecting database operation timing, and apparatuses for detecting database operation timing, and more particularly to a recording medium recorded with a program for detecting database operation timing, a method of detecting database operation timing, and an apparatus for detecting database operation timing which program, method, and apparatus detect timing of performing page relocation in a database or timing of performing the capacity expansion of the database.

A network structure database employs prime pages and overflow pages, which are used when the prime pages have no space, so as to enable a high-speed access thereto.

Once on-line operations start, such a database requires page (record) relocation since record addition, deletion, or update creates fragmentary spaces in the prime and overflow pages. Further, if the database seems to run out of its capacity, the capacity of the database has to be expanded.

Timing of performing the page relocation in or the capacity expansion of such a database should be detected accurately with a minimum influence on the on-line operations.

2. Description of the Related Art

Conventionally, a system administrator has judged the necessity of page relocation in or the capacity expansion of a database based on the analysis results of a job executed to recognize the storage condition of data in the database, that is, based on analysis results as to whether the number of regions that are not reusable due to fragmentation is large or small.

Then, if the system administrator determines, based on the analysis results, that the number of reusable regions is so large that the database requires page relocation, the system administrator performs the page relocation during a jog execution by activating a program configured in accordance with an invention disclosed in Japanese Laid-Open Patent Application No. 6-110743.

Further, if the system administrator determines, based on the analysis results, that such page relocation does not allow the database to store further data, the system administrator activates a program for implementing the capacity expansion of the database so as to expand the capacity of the database.

Thus, according to a conventional method, the system administrator judges the necessity of page relocation in or the capacity expansion of the database by executing the job for recognizing the data storage condition of the database. This job is executed at a timing when the on-line operations are stopped.

The job executed at this timing is input to and output from the entire database so as to recognize the data storage condition of the database.

According to such a conventional method, however, the on-line operations should be stopped in order to judge the necessity of the page relocation in or the capacity expansion of the database, thus causing a problem that a request for an on-line operation hour extension cannot be answered. Especially, this is a problem in 24-hour continuous on-line operations.

Further, according to the conventional method, the system administrator, based on her/his experience, judges the necessity of the page relocation in or the capacity expansion of the database, referring to the analysis results of the above-described job.

However, this does not mean that the page relocation in or the capacity expansion of the database is always performed at an appropriate timing.

Therefore, in the worst case, the conventional method causes the shortage of the capacity of the database so that an on-line program is prevented from storing records to end abnormally.

SUMMARY OF THE INVENTION

It is a general object of the present invention to provide a recording medium recorded with a program for detecting database operation timing, a method of detecting database operation timing, and an apparatus for detecting database operation timing in which the above-described disadvantage is eliminated.

A more specific object of the present invention is to provide a recording medium recorded with a program for detecting database operation timing, a method of detecting database operation timing, and an apparatus for detecting database operation timing which program, method, and apparatus accurately detect timing of performing page relocation in a database or timing of performing the capacity expansion of the database with a minimum influence on on-line operations.

The above objects of the present invention are achieved by a recording medium including a program causing a computer to execute the steps of (a) predicting a data storage condition of a database from a record operation, (b) computing a number of relocatable areas and a number of areas in an expansion direction based on the data storage condition predicted in the step (a), and (c) detecting operation timing with respect to the database based on the numbers computed in the step (b).

The above objects of the present invention are also achieved by a recording medium including a program causing a computer to execute the steps of (a) determining whether a new overflow area is generated by a record operation, (b) determining whether fragmentation is generated in a prime area or overflow areas including the new overflow area linked thereto by the record operation if it is determined in the step (a) that the new overflow area is generated, (c) computing a number of relocatable areas and a number of areas in an expansion direction based on a result of the step (b), and (d) detecting operation timing with respect to the database based on the numbers computed in the step (c).

The above objects of the present invention are also achieved by a method of detecting database operation timing which method includes the steps of (a) determining whether a new overflow area is generated by a record operation, (b) determining whether fragmentation is generated in a prime area or overflow areas including the new overflow area linked thereto by the record operation if it is determined in the step (a) that the new overflow area is generated, (c)

computing a number of relocatable areas and a number of areas in an expansion direction based on a result of the step (b), and (d) detecting operation timing with respect to the database based on the numbers computed in the step (c).

The above objects of the present invention are further achieved by an apparatus for detecting database operation timing which apparatus includes a first determination part for determining whether a new overflow area is generated by a record operation, a second determination part for determining whether fragmentation is generated in a prime area or overflow areas including the new overflow area linked thereto by the record operation if it is determined by the first determination part that the new overflow area is generated, a computation part for computing a number of relocatable areas and a number of areas in an expansion direction based on a determination result of said second determination part, and a detection part for detecting operation timing with respect to the database based on the numbers computed by the computation part.

According to the above-described recording media, method, and apparatus, the necessity of page relocation in or the capacity expansion of the database can be judged without executing a job for recognizing the data storage condition of the database. Therefore, on-line operations are prevented from a stoppage, thus minimizing influence thereon.

Further, the necessity of page relocation in or the capacity expansion of the database can be judged without depending on a system administrator, thus preventing unnecessary page relocation in the database or an unnecessary capacity expansion thereof from being performed.

BRIEF DESCRIPTION OF THE DRAWINGS

Other objects, features and advantages of the present invention will become more apparent from the following detailed description when read in conjunction with the accompanying drawings, in which:

FIG. 11 is a diagram showing cases to which a record operation corresponds in step S5 of FIG. 9;

FIG. 12 is a diagram for illustrating a prediction management update operation performed in step 6 of FIG. 9;

FIG. 13 is a diagram for illustrating a method of determining timings to perform page relocation in the NDB and an expansion thereof in steps 7 through 14 in FIGS. 9 and 10;

FIG. 14 is a diagram for illustrating the page relocation in and the expansion of the NDB.

DETAILED DESCRIPTION OF THE PREFERRED EMBODIMENTS

A description will now be given, with reference to the accompanying drawings, of an embodiment of the present invention.

Figure 1:
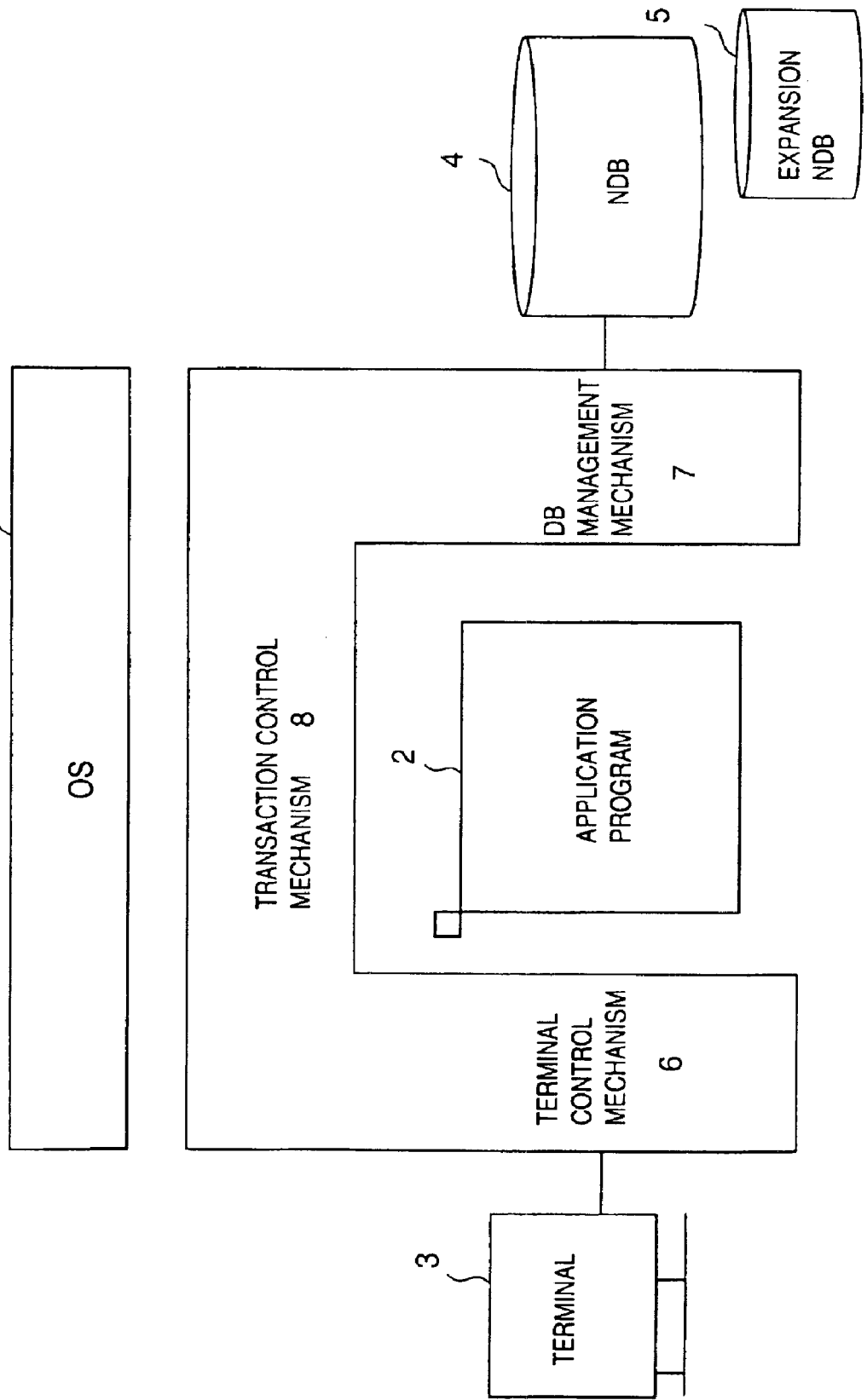
FIG. 1 is a diagram showing a structure of a computer system according to the present invention.

FIG. 1 is a diagram showing a structure of a computer system according to the present invention. As shown in FIG. 1, the computer system includes an operating system (OS) 1, an application program 2, a terminal 3, a network structure database (NDB) 4, an expansion NDB 5 capacity-expanded from the NDB 4, a terminal control mechanism 6 operating under the OS 1 to control the terminal 3, a database (DB) management mechanism 7 operating under the OS 1 to manage the NDB 4 and the expansion NDB 5, and a transaction control mechanism 8 for controlling transactions.

Figure 2:
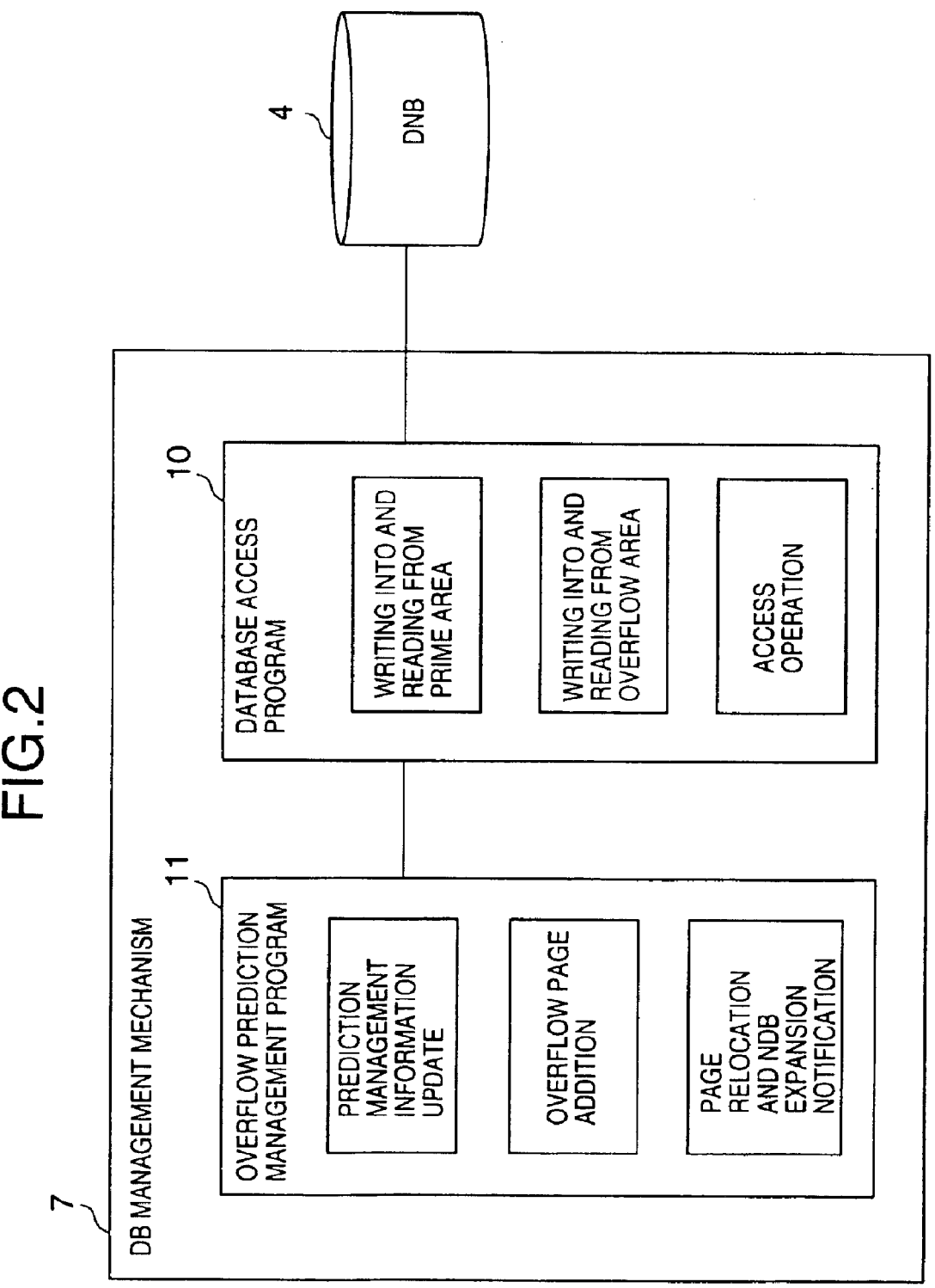
FIG. 2 is a diagram showing a program structure of a DB management mechanism shown in FIG.

FIG. 2 is a diagram showing a program structure of the DB management mechanism 7.

As shown in FIG. 2, the DB management mechanism 7 includes an overflow prediction management program 11 provided to realize the present invention as well as a conventionally provided database access program 10.

As will be described later, the overflow prediction management program 11 updates prediction management information 400 recorded in prime pages, performs an addition operation of an overflow page, and posts an instruction for page relocation in the NDB 4 or the expansion NDB 5, and an instruction for the generation of the expansion NDB. The overflow prediction management program 11 can be stored in an appropriate recording medium such as a computer-readable semiconductor memory.

Figure 3:
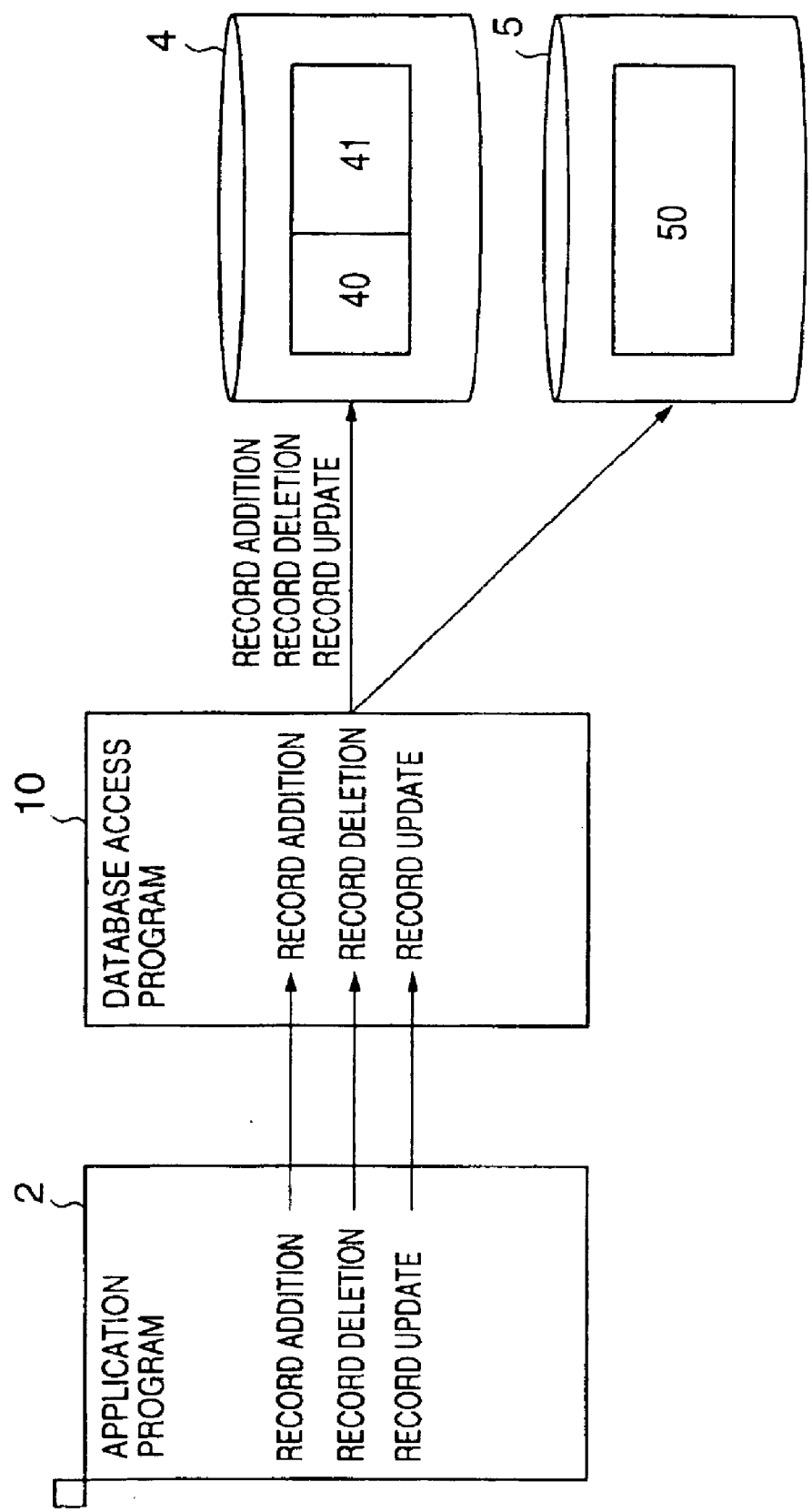
FIG. 3 is a diagram for illustrating an NDB shown in FIGS. 1 and 2.

FIG. 3 is a diagram for illustrating the NDB 4.

The NDB 4 is accessed by the record, and, as shown in FIG. 3, employs two types of pages (input/output units) of the prime pages loaded into a prime area 40 and overflow pages loaded into an overflow area 41. The NDB 4 uses the prime pages prior to the overflow pages. If there is no space in the prime pages, the NDB 4 uses the overflow pages. If there is no space in the overflow pages, the NDB 4 allocates the next overflow page from the overflow area 41. Thereby, the NDB 4 enables a high-speed access thereto.

If the NDB 4 is filled to its capacity, overflow pages loaded into an overflow area 50 of the expansion NDB 5 are used.

Figure 4:
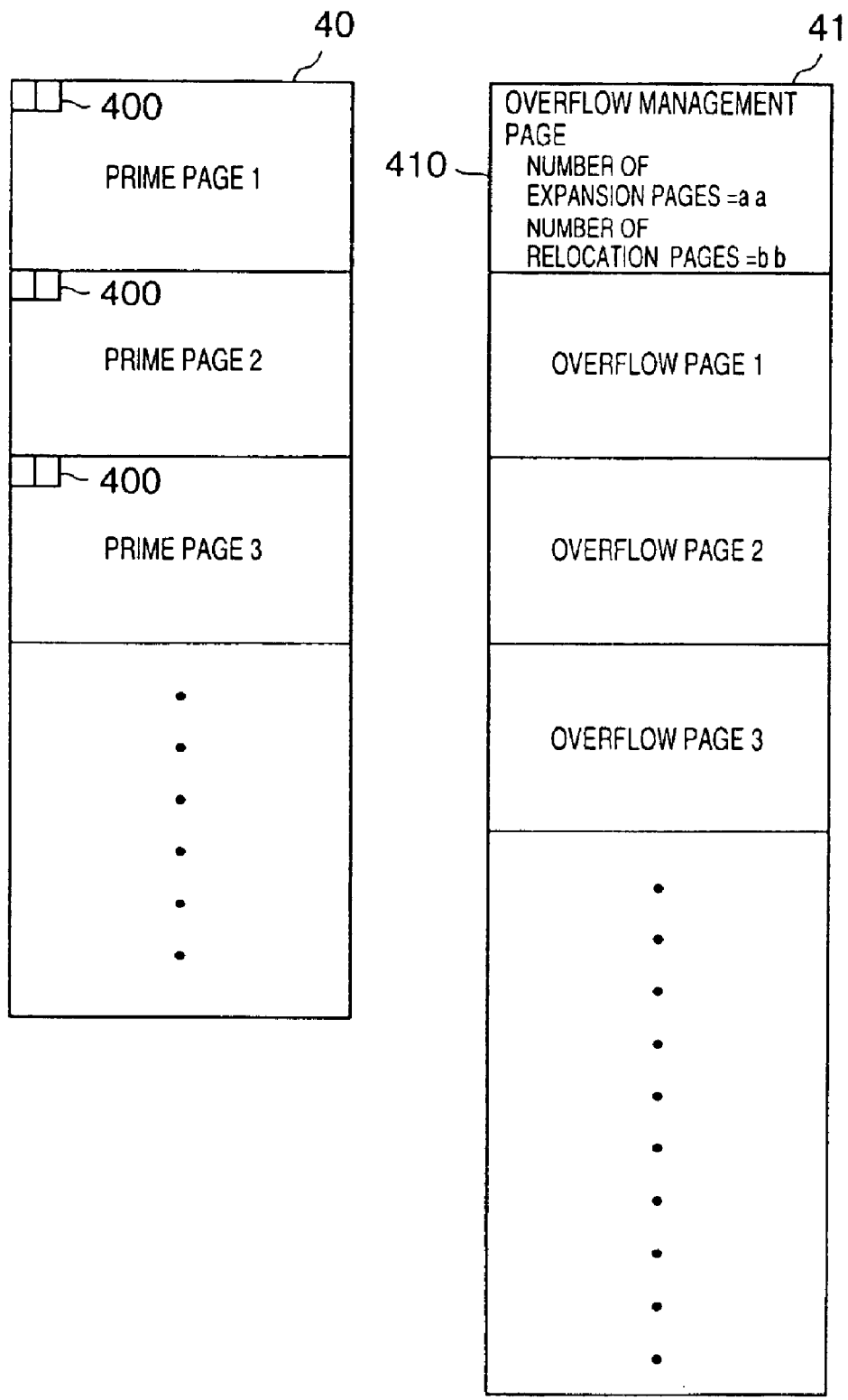
FIG. 4 is a diagram showing embodiments of a prime area and an overflow area of the NDB.

FIG. 4 is a diagram showing embodiments of the prime area 40 and the overflow area 41 of the NDB 4.

The overflow area 50 of the expansion NDB 5 has the same structure as the overflow area 41 of the NDB 4.

As shown in FIG. 4, each prime page loaded into the prime area 40 has the two-bit prediction management information 400. On the other hand, an overflow management page 410 is provided in the overflow area 41 to manage the numbers of expansion pages (pages in an expansion direction) and relocation (relocatable) pages.

Figure 5:
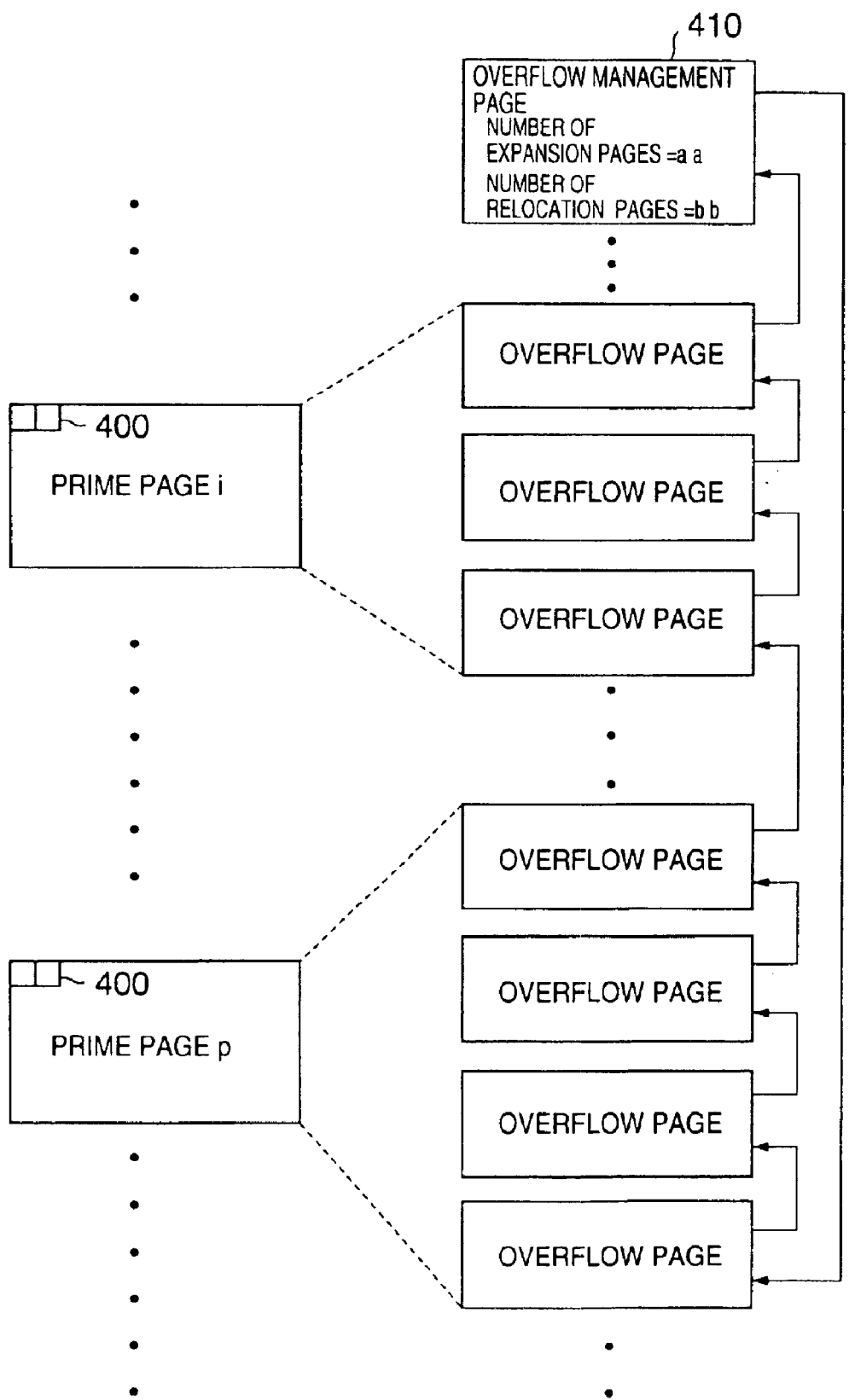
FIG. 5 is a diagram for illustrating an operation of an overflow management page shown in FIG. 4.

FIG. 5 is a diagram for illustrating an operation of the overflow management page 410.

In addition to the management of the numbers of expansion pages and relocation pages, the overflow management page 410 identifies an overflow page in use by using a link as shown in FIG. 5.

A record to be stored in a prime page identifies overflow pages linked to the prime page by using a pointer, which is not shown in FIG. 5.

Figure 6:
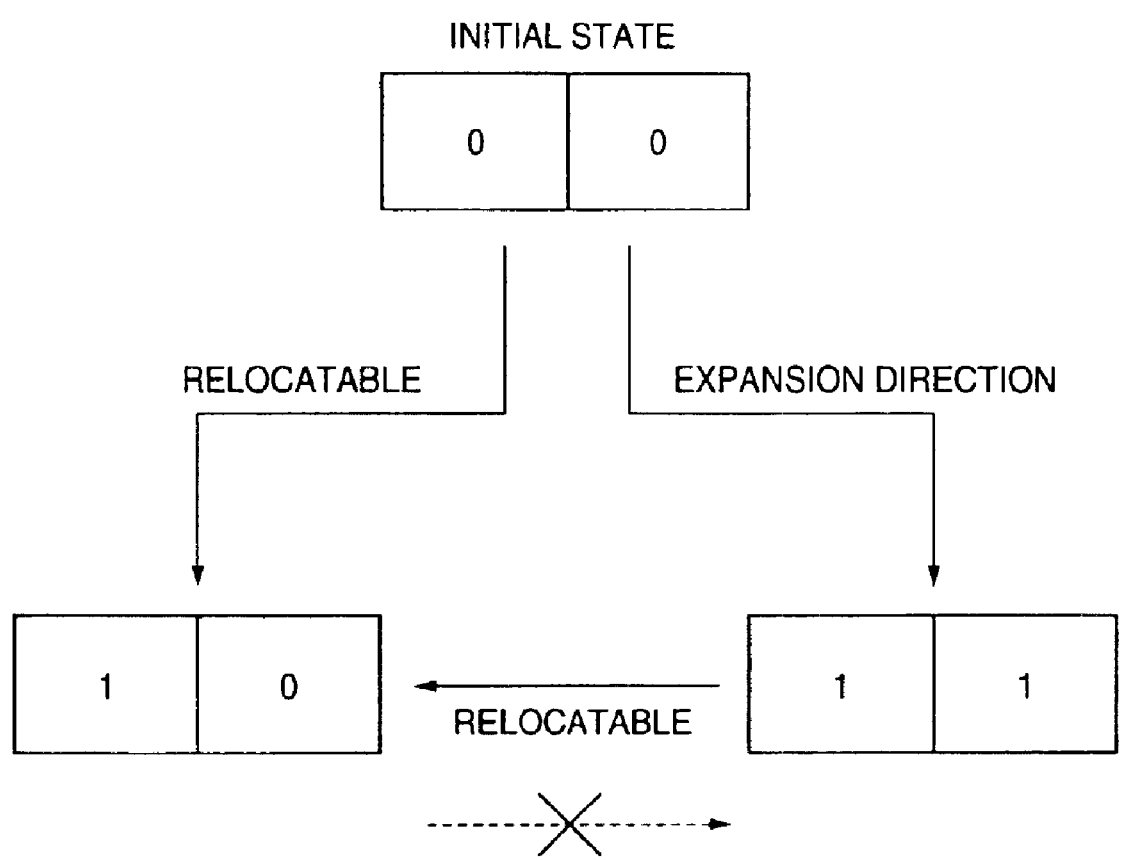
FIG. 6 is a diagram showing an embodiment of prediction management information of each prime page shown in FIGS. 4 and 5.

FIG. 6 is a diagram showing an embodiment of the prediction management information 400 of each prime page.

As shown in FIG. 6, the prediction management information 400 is formed of two bits, and manages a value "00" in an initial state, a value "10" if a prime page having the prediction management information 400 and overflow pages linked to the prime page are relocatable, and a value "11" if the prime page and the overflow pages linked thereto are in the expansion direction.

That is, the values "10" and "11" of the prediction management information 400 indicate, respectively, that a page set of the prime page and the overflow pages linked thereto has fragmentation and thus is relocatable, and that the page set has no fragmentation and thus is in the expansion direction.

Figure 7:
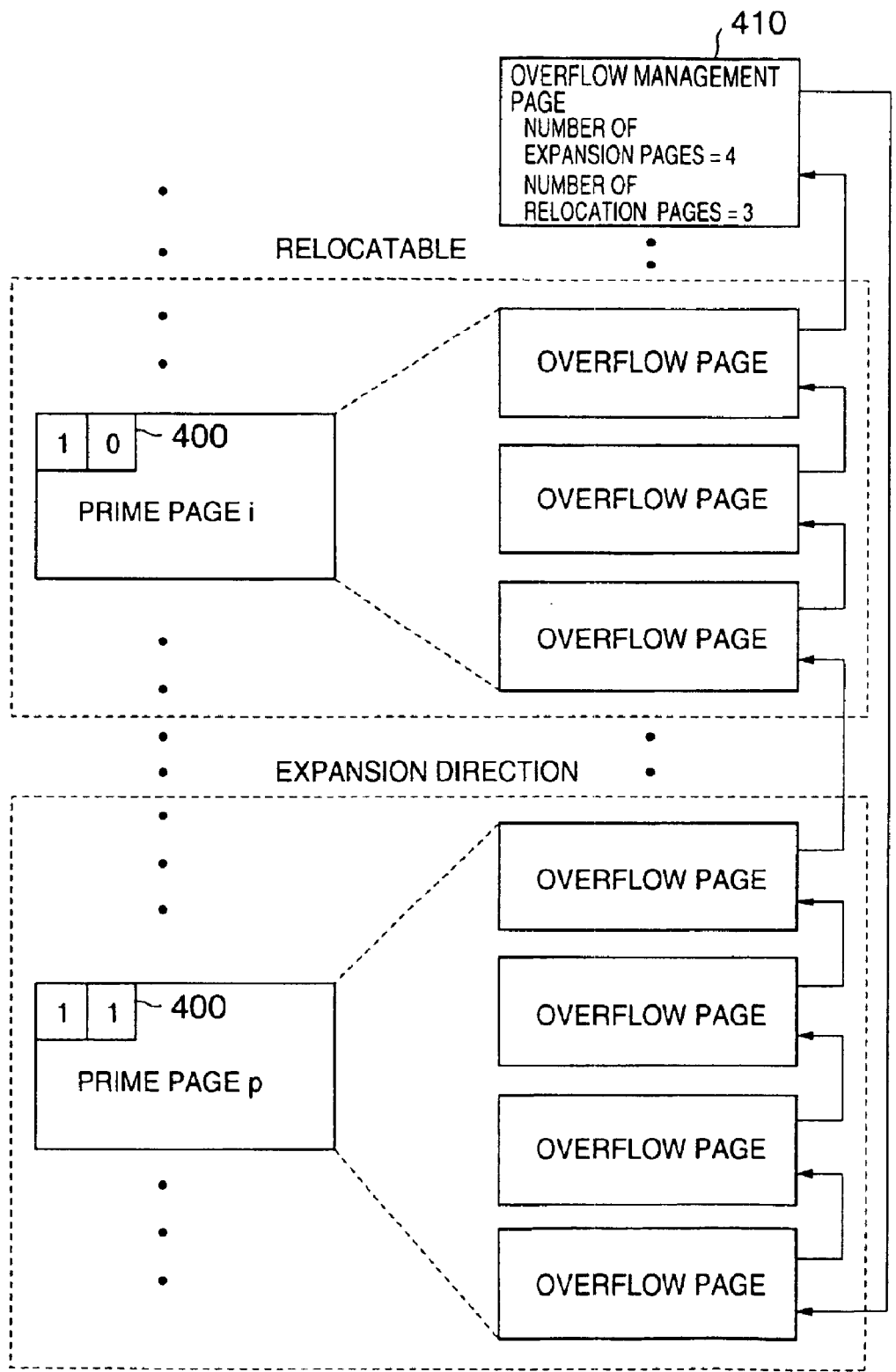
FIG. 7 is a diagram for illustrating an overflow page management operation performed by an overflow management page shown in FIGS. 4 and 5.

FIG. 7 is a diagram for illustrating an overflow page management operation.

For instance, as shown in FIG. 7, if the prediction management information 400 of a prime page i is recorded with the value "10", it is indicated that a page set of the prime page i and overflow pages linked thereto has fragmentation, and thus is relocatable. If the prediction management information 400 of a prime page p is recorded with the value "11", it is indicated that a page set of the prime page p and overflow pages linked thereto has no fragmentation, and thus is in the expansion direction.

The number of expansion pages managed by the overflow management page 410 is the total number of the overflow pages of the page set in the expansion direction. In FIG. 7, the overflow management page 410 manages the number "4" as the number of expansion pages.

On the other hand, the number of relocation pages managed by the overflow management page 410 is the total number of the overflow pages of the relocatable page set. In FIG. 7, the overflow management page 410 manages the number "3" as the number of relocation pages.

If fragmentation is generated in the page set in the expansion direction, the page set becomes relocatable. In this case, the prediction management information 400 has the value "11" updated to the value "10" as shown in FIG. 6.

If the fragmentation disappears in the relocatable page set, the page set is to be in the expansion direction. However, this seldom happens and is quite exceptional. Therefore, the page set in which fragmentation is once generated is considered as relocatable even if a new overflow page is added to the page set after the generation of the fragmentation. Consequently, as shown in FIG. 6, once the prediction management information 400 is set to the value "10", the value "10" is never updated to the value "11".

Figure 8A:
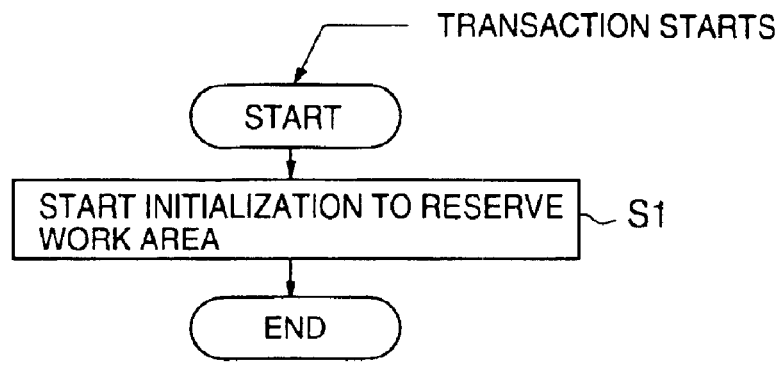
FIGS. 8A and 8B are flowcharts of an operation performed by a database access program shown in FIGS. 2 and 3.
Figure 8B:
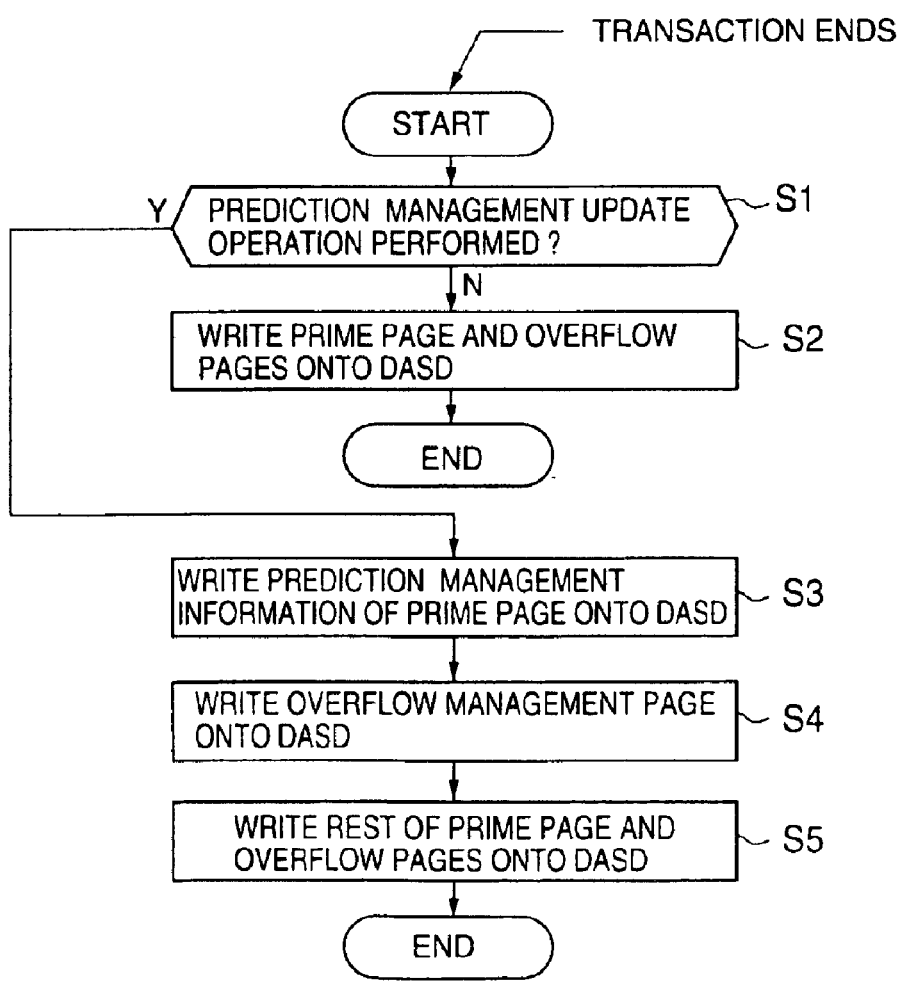
Figure 9:
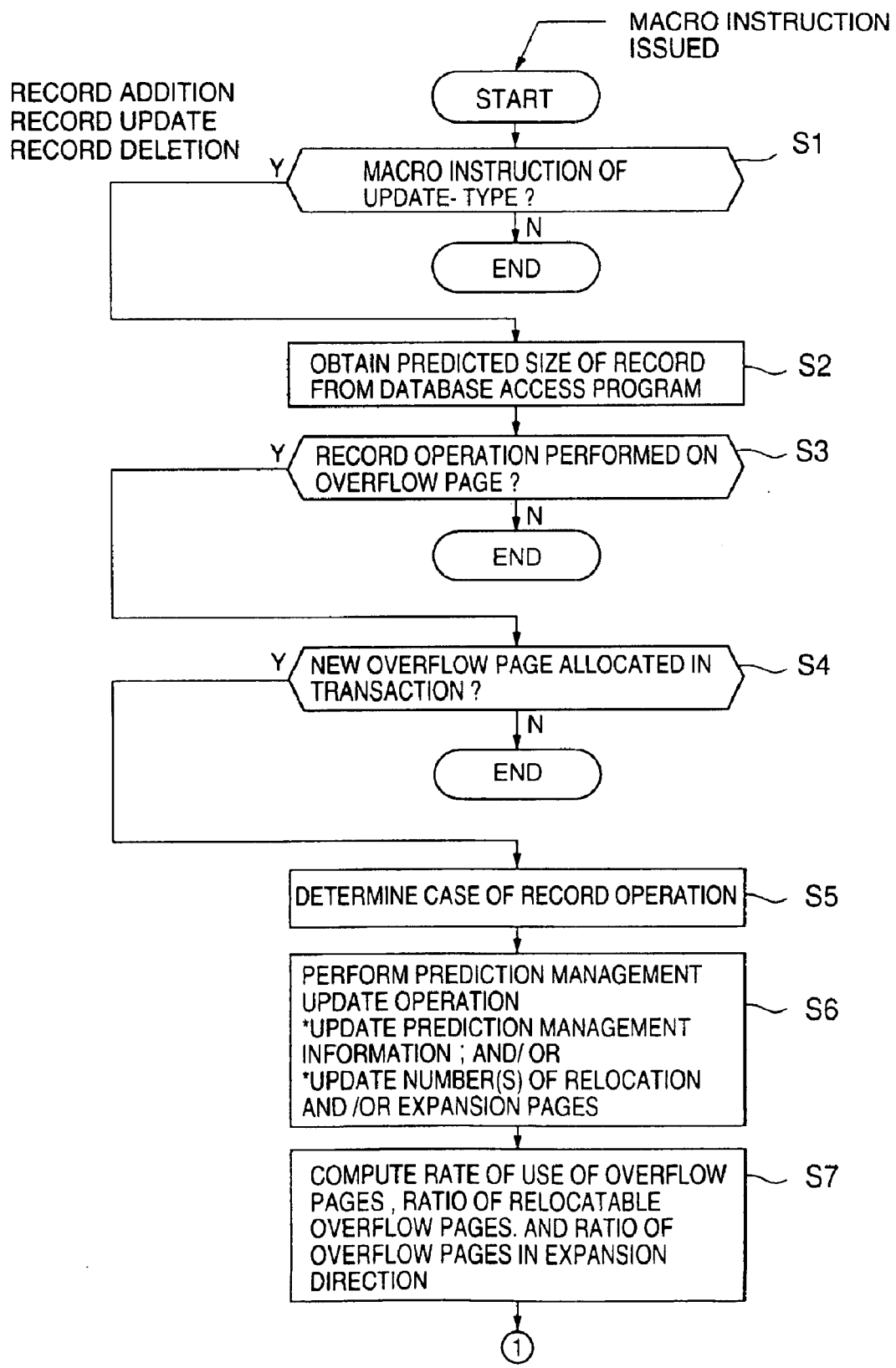
FIGS. 9 and 10 are flowcharts of an operation performed by an overflow prediction management program shown in FIG. 2.
Figure 10:
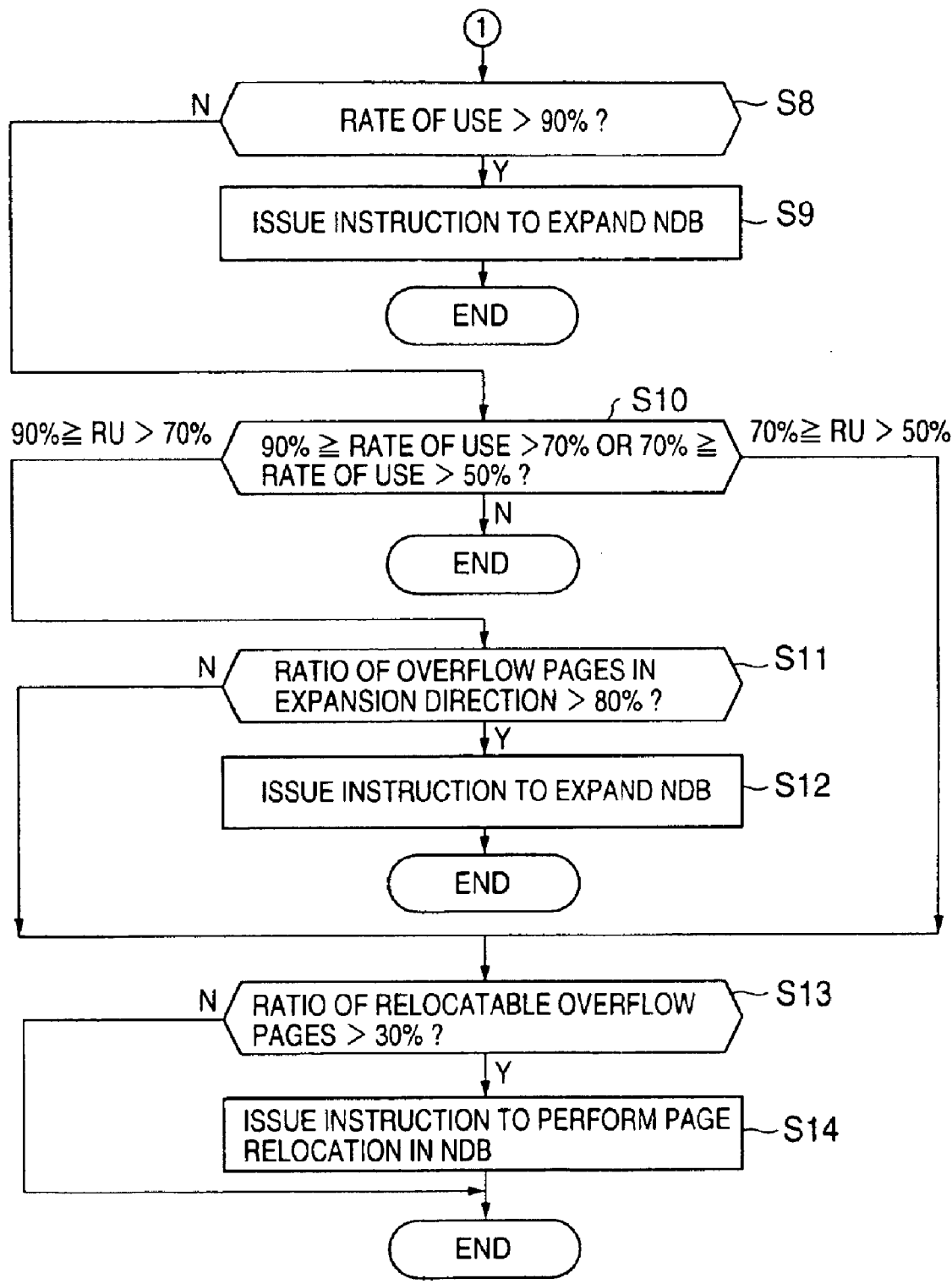

FIGS. 8A and 8B are flowcharts of an operation performed by the database access program 10, and FIGS. 9 and 10 are flowcharts of an operation performed by the overflow prediction management program 11.

Next, a description will be given of the present invention in accordance with these flowcharts.

First, a description will be given of the operation performed by the database access program 10.

As shown in FIG. 8A, the database access program 10 performs an initialization operation to reserve a work area when a transaction starts.

On the other hand, when the transaction ends, as shown in FIG. 8B, the database access program 10 first determines in step S1 whether or not the prediction management information 400 of a prime page is updated and/or the number of expansion pages and/or the number of relocation pages managed by the overflow management page 410 are/is updated by a record operation in the transaction.

If it is determined in step S1 that such a prediction management update operation, which is performed by the overflow prediction management program 11 as will be described later, is not performed, the operation proceeds to step S2. In step S2, the prime page and the overflow pages read in response to the issuance of the macro instruction for the record operation are written to the NDB 4 in a direct access storage device (DASD), and then the operation ends.

On the other hand, if it is determined in step S1 that a prediction management update operation is performed, the operation proceeds to step S3. In step S3, the updated prediction management information 400 of the prime page is written to the NDB 4 in the DASD, and in step S4, the updated number of expansion pages and/or the updated number of relocation pages managed by the overflow management page 410 are/is written to the NDB 4 in the DASD.

Next, in step S5, the rest of the prime page and the overflow pages are written to the NDB 4 in the DASD, and then the operation ends.

Thus, when the transaction ends, the database access program 10 writes to the NDB 4 in the DASD the prime page and overflow pages read in response to the issuance of the macro instruction for the record operation, and the overflow management page 410. Thereafter, the database access program 10 terminates the operation.

Next, a description will be given of the operation performed by the overflow prediction management program 11.

If the database access program 10 issues a macro instruction for a record operation in response to a request from the application program 2 in a transaction, the overflow prediction management program 11 first determines in step S1 whether the issued macro instruction is of an update type as shown in FIG. 9.

If it is determined in step S1 that the issued macro instruction is not of an update type, that is, if it is determined that the issued macro instruction is for a record retrieval, it is determined that a below-described prediction management is unnecessary, the operation ends without performing further steps.

On the other hand, if it is determined in step S1 that the issued macro instruction is of an update type, such as a record addition, deletion, or update, the operation proceeds to step S2. In step S2, a predicted size of a record (a record length) processed by the macro instruction is obtained from the database access program 10.

Next, in step S3, it is determined whether the database access program 10 performs the record operation on an overflow page in response to the issuance of the macro instruction. If it is determined in step S3 that the record operation is not performed on the overflow page, that is, if it is determined that the record operation is performed on a prime page, it is determined that a below-described prediction management is unnecessary, and the operation ends without performing further steps. This is because, at this stage, no relocatable or capacity expansion state is generated, that is, no page set is relocatable or in the expansion direction.

On the other hand, if it is determined in step S3 that the database access program 10 performs the record operation on the overflow page, the operation proceeds to step S4. In step S4, it is determined whether the database access program 10 allocates a new overflow page during the transaction in process. If it is determined in step S4 that a new overflow page is not allocated in the transaction, it is determined that a below-described prediction management is unnecessary, and the operation ends without performing further steps. This is because, at this stage, no relocatable or capacity expansion state is generated.

On the other hand, if it is determined in step S4 that a new overflow page is allocated in the transaction, the operation proceeds to step S5. In step S5, it is determined which case the record operation performed by the database access program 10 this time corresponds to based on record operation types and predicted sizes of records (record lengths) of last time and this time.

FIG. 11 is a diagram showing cases to which the record operation corresponds. For convenience of description, a description will be given of typical six cases.

If a record length deleted by the last operation is equal to that added by this operation, it is determined that this operation corresponds to CASE 1 having a future prediction of NO CHANGE.

If a record length deleted by the last operation is longer than that added by this operation, it is determined that this operation corresponds to CASE 2 having a future prediction of EXPANSION DIRECTION.

If a record length deleted by the last operation is shorter than that added by this operation, it is determined that this operation corresponds to CASE 3 having a future prediction of RELOCATABLE indicating generation of fragmentation.

If a record length updated by the last operation is equal to that updated by this operation, it is determined that this operation corresponds to CASE 4 having the future prediction of NO CHANGE.

If a record length updated by the last operation is longer than that updated by this operation, it is determined that this operation corresponds to CASE 5 having the future prediction of EXPANSION DIRECTION.

If a record length updated by the last operation is shorter than that updated by this operation, it is determined that this operation corresponds to CASE 6 having the future prediction of RELOCATABLE indicating generation of fragmentation.

Next, in FIG. 9, after it is determined in step S5 which case the record operation performed by the database access program 10 this time corresponds to, in step S6, a prediction management update operation is performed to update the prediction management information 400 of the prime page and/or the number of expansion pages and/or the number of relocation pages managed by the overflow management page 410 based on the case to which the record operation corresponds.

FIG. 12 is a diagram for illustrating the prediction management update operation.

For instance, if the record operation performed by the database access program 10 corresponds to CASE 1 or 4, the value of the prediction management information 400 of the prime page is not updated as shown in FIG. 12.

In this case, if the value of the prediction management information 400 indicates "10 (RELOCATABLE)", the number of relocation pages managed by the overflow management page 410 is incremented by one, and if the value of the prediction management information 400 indicates "11 (EXPANSION DIRECTION)", the number of expansion pages managed by the overflow management page 410 is incremented by one.

In the case where the record operation performed by the database access program 10 corresponds to CASE 2 or 5, as shown in FIG. 12, the value of the prediction management information 400 is updated to "11 (EXPANSION DIRECTION)" if the value indicates "00 (INITIAL STATE)", but is not updated for the reason previously described with reference to FIG. 6 if the value indicates "10 (RELOCATABLE)". The value is not updated either if the value indicates "11 (EXPANSION DIRECTION)", for there is no change in the future prediction.

At this point, if the value of the prediction management information 400 is updated from "00 (INITIAL STATE)" to "11 (EXPANSION DIRECTION)", a value "1" is entered in the number of expansion pages managed by the overflow management page 410. In the case where the value is not updated, the number of relocation pages managed by the overflow management page 410 is incremented by one if the value indicates "10 (RELOCATABLE)", and the number of expansion pages is incremented by one if the value indicates "11 (EXPANSION DIRECTION)".

In the case where the record operation performed by the database access program 10 corresponds to CASE 3 or 6, as shown in FIG. 12, the value of the prediction management information 400 of the prime page is updated to "10 (RELOCATABLE)" if the value indicates "00 (INITIAL STATE)" or "11 (EXPANSION DIRECTION)", is not updated if the value indicates "10 (RELOCATABLE)", for there is no change in the future prediction.

At this point, if the value is updated from "00 (INITIAL STATE)" to "10 (RELOCATABLE)", a value "1" is entered in the number of relocation pages managed by the overflow management page 410. If the value is not updated, the number of relocation pages is incremented by one. If the value is updated from "11 (EXPANSION DIRECTION)" to "10 (RELOCATABLE)", the number of all the overflow pages linked to the prime page is entered in the number of relocation pages, and the number of expansion pages is reset to an initial value "0".

Thus, in step S6, the prediction management update operation is performed so that the overflow management page 410 manages the numbers of expansion and relocation pages as described above in FIG. 7.

Next, in step S7, based on the total number of overflow pages (TN) loaded into the overflow area 41, which number is entered in the overflow management page 410, and the numbers of expansion and relocation pages (NE and NR) managed by the overflow management page 410, the rate of use of overflow pages (RU) is given by the following equation $$RU=(NE+NR)/TN,$$

and the ratio of relocatable overflow pages (RR) and the ratio of overflow pages in the expansion direction (RE) are given by the following equations $$RR=NR/TN$$

$$RE=NE/TN$$

Next, as shown in FIG. 10, it is determined in step S8 whether the rate of use of overflow pages is higher than 90%. If it is determined in step S8 that the rate of use of overflow pages is higher than 90%, the operation proceeds to step S9. In step S9, an instruction is issued to expand the NDB 4, and then the operation ends.

That is, if the rate of use of overflow pages is higher than 90%, the NDB 4 is almost filled to its capacity. Therefore, the instruction is issued to expand the NDB 4 irrespective of the ratio of relocatable overflow pages or overflow pages in the expansion direction.

On the other hand, if it is determined in step S8 that the rate of use of overflow pages does not exceed 90%, the operation proceeds to step S10 to determine whether the rate of use is higher than 70% and lower than or equal to 90%, whether the rate of use is higher than 50% and lower than or equal to 70%, and whether the rate of use is lower than or equal to 50%.

If it is determined in step S10 that the rate of use is lower than or equal to 50%, the operation ends without providing an instruction to expand the NDB 4 or perform page relocation therein.

That is, if the rate of use is lower than or equal to 50%, the NDB 4 has sufficient space in its capacity. Therefore, no instruction is issued to expand the NDB 4 or perform page relocation therein.

On the other hand, if it is determined in step S10 that the rate of use is higher than 70% and lower than or equal to 90%, the operation proceeds to step S11 to determine whether the ratio of overflow pages in the expansion direction (RE) is higher than 80%. If it is determined in step S11 that the RE is higher than 80%, the operation proceeds to step S12 to issue an instruction to expand the NDB 4, and then the operation ends.

That is, if the rate of use is higher than 70% and lower than or equal to 90% and the RE is higher than 80%, the NDB 4 is almost filled to its capacity. Therefore, the instruction is issued to expand the NDB 4.

On the other hand, if it is determined in step S11 that the RE is lower than or equal to 80%, or if it is determined in step S10 that the rate of use is higher than 50% and lower than or equal to 70%, the operation proceeds to step S13 to determine whether the ratio of relocatable overflow pages (RR) is higher than 30%.

If it is determined in step S13 that the RR is higher than 30%, the operation proceeds to step S14 to issue an instruction to perform page relocation in the NDB 4, and then the operation ends. On the other hand, if it is determined in step S13 that the RR is lower than or equal to 30%, the operation ends without providing an instruction to perform page relocation in the NDB 4.

That is, if the rate of use is higher than 50% and lower than or equal to 70% and the RR is higher than 30%, it is desirable to lower the rate of use by page relocation in the NDB 4. Therefore, the instruction is issued to perform page relocation in the NDB 4.

If the rate of use is higher than 50% and lower than or equal to 70%, the RE is lower than or equal to 80% so that the expansion of the NDB 4 is not necessary, and the RR is higher than 30%, it is desirable to lower the rate of use by page relocation in the NDB 4. Therefore, the instruction is issued to perform page relocation in the NDB 4.

Thus, the overflow prediction management program 11 predicts the data storage condition of the NDB 4 from a record operation performed in a transaction so as to compute the rate of use of overflow pages, the ratio of relocatable overflow pages, and the ratio of overflow pages in the expansion direction, based on which the overflow prediction management program 11 issues an instruction to expand the NDB 4 or perform page relocation therein in accordance with, for instance, a determination method as shown in FIG. 13.

In the above-described steps, steps S1 through S4 form a first determination step, step 5 forms a second determination step, step 6 forms a computation step, and steps 7 through 14 form a detection step of a method of detecting database operation timing.

Further, in the above-described steps, steps S1 through S4 form a first determination part, step 5 forms a second determination part, step 6 forms a computation part, and steps 7 through 14 form a detection part of an apparatus for detecting database operation timing.

FIG. 14 is a diagram for illustrating page relocation in and the expansion of the NDB 4.

In response to the instruction to perform page relocation in the NDB 4 issued by the overflow prediction management program 11, a relocation program 100, for instance, is activated as shown in FIG. 14 so as to perform page relocation in the NDB 4. At this point, it is desirable that the object of page relocation should not be limited to the relocatable overflow pages, but include all the overflow pages and all the prime pages, On the other hand, in response to the instruction to expand the NDB 4 issued by the overflow prediction management program 11, a DB expansion program 200, for instance, is activated as shown in FIG. 14 so that the expansion NDB 5 is generated to expand from the NDB 4.

According to a system shown in FIG. 14, the relocation program 100 or the DB expansion program 200 is activated in response to the instruction issued by the overflow prediction management program 11 so as to automatically perform page relocation in the NDB 4 or the expansion thereof. On the other hand, in some cases, a message to instruct page relocation in the NDB 4 or the expansion thereof is output on the display screen of the terminal 3 shown in FIG. 1.

Next, a description will be given, with reference to FIGS. 15A through 17B, of an operation of the system of the above-described structure.

Figure 15A:
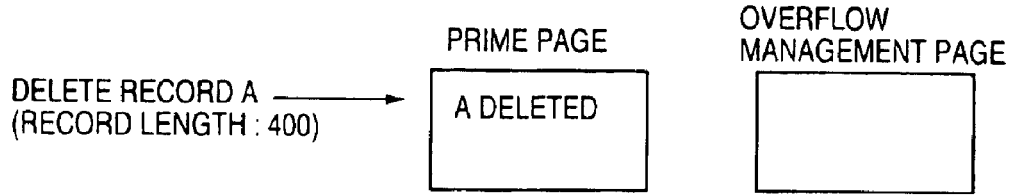
FIGS. 15A through 17B are diagrams for illustrating an operation of a system of FIG. 14 according to the present invention.
Figure 15B:
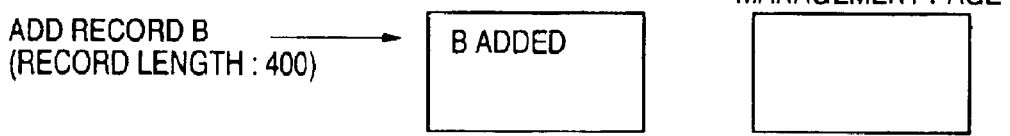

If the database access program 10, during the execution of a transaction, receives an addition request of a record B of a record length of 400 after deleting a record A of a record length of 400 stored in a prime page as shown in FIG. 15A, the database access program 10 store the record B in the prime page having a space of the record length of 400 as shown in FIG. 15B.

Figure 15C:
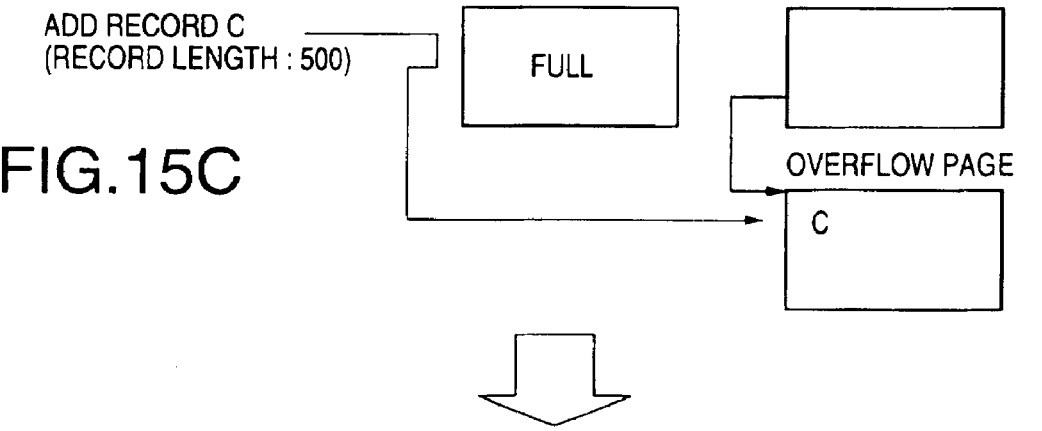

Thereafter, if the database access program 10 receives an addition request of a record C of a record length of 500, the database access program 10 allocates a new overflow page to store the record C therein since the prime page is full as shown in FIG. 15C.

Figure 16A:
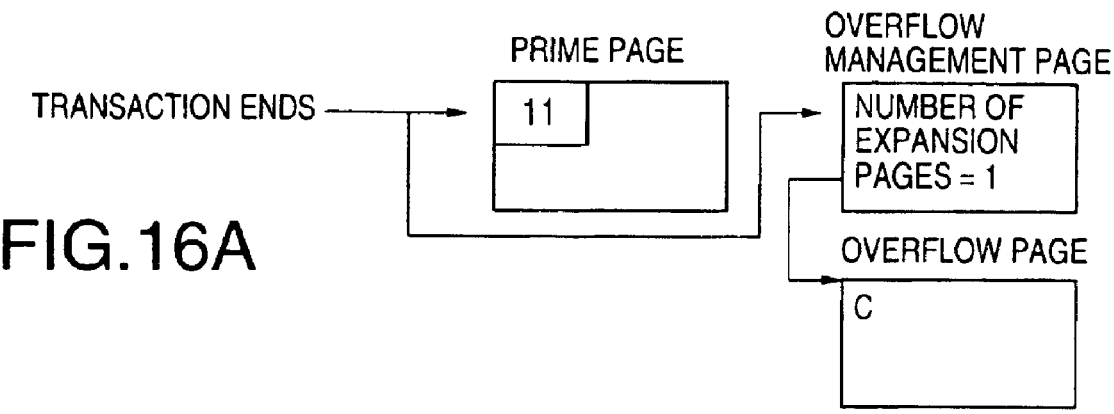

The overflow prediction management program 11 determines the case of this record operation (the case of a series of additions) in this transaction so as to determine that the NDB 4 is in the expansion direction. Then, as shown in FIG. 16A, the overflow prediction management program 11 sets the value of the prediction management information 400 of the prime page to "11 (EXPANSION DIRECTION)", and increment the number of expansion pages managed by the overflow management page 410 by one to set the number of expansion pages to "1". Thereafter, at the end of the transaction, the overflow prediction management program 11 writes the updated value of the prediction management information 400 and the updated number of expansion pages to the NDB 4 in the DASD.

Figure 16B:
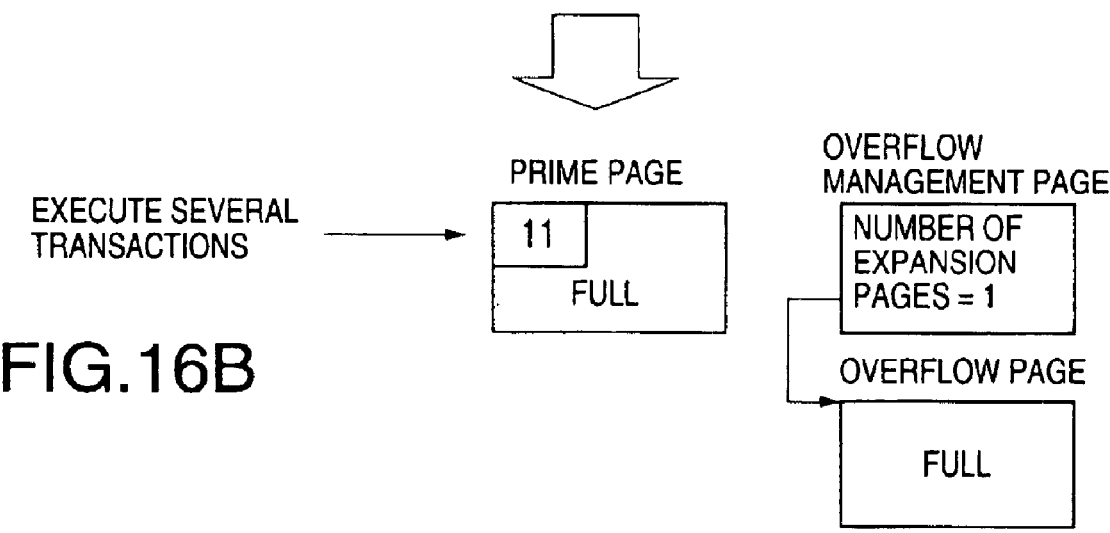

Next, the database access program 10 fills the allocated overflow page by executing several transactions as shown in FIG. 16B.

Figure 16C:
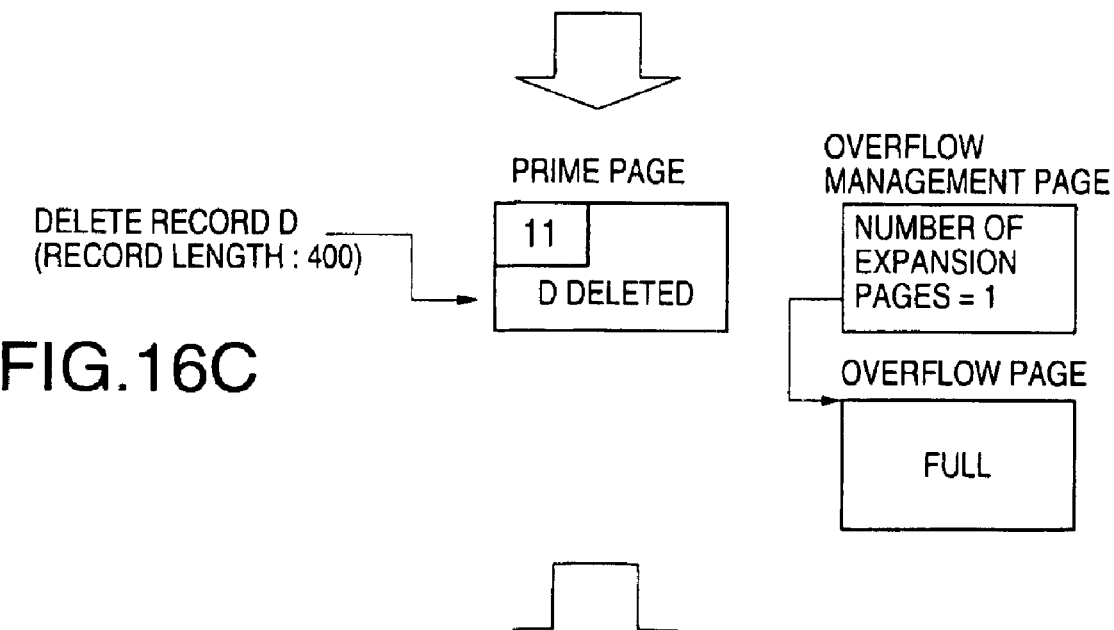
Figure 17A:
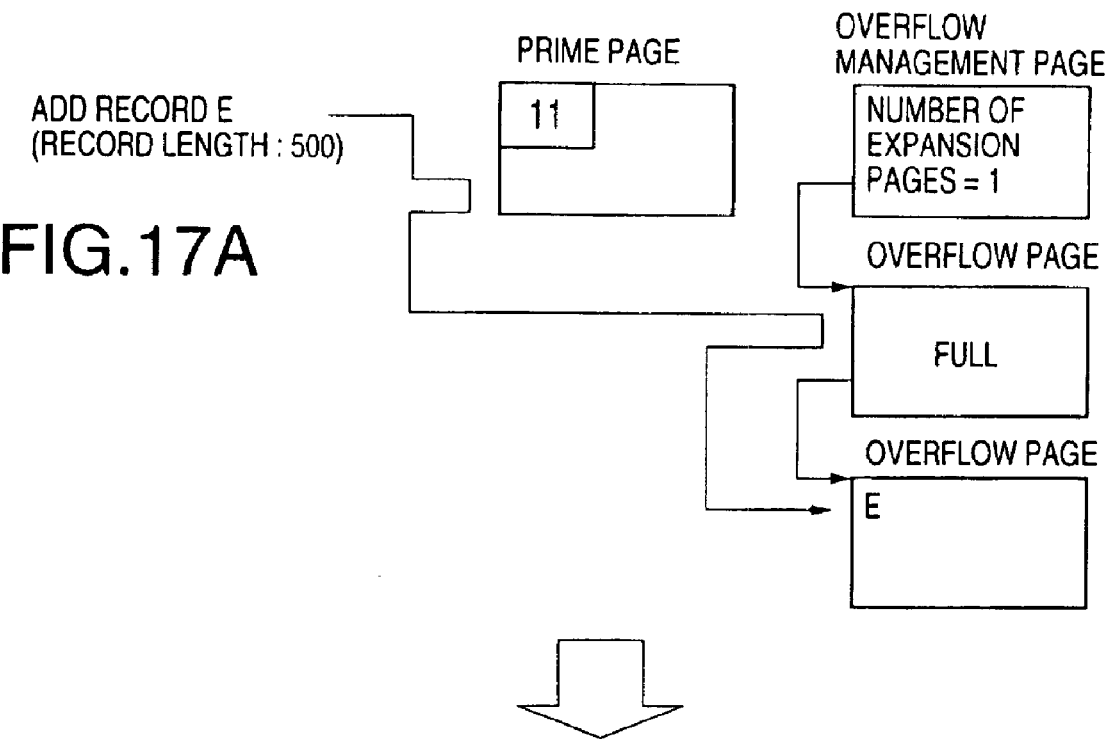

Thereafter, if the database access program 10, while executing a transaction following the preceding transactions, receives an addition request of a record E of a record length of 500 after deleting a record D of a record length of 400 as shown in FIG. 16C, the database access program 10 allocates a new overflow page to store the record E therein since the allocated overflow page is full as shown in FIG. 17A.

Figure 17B:
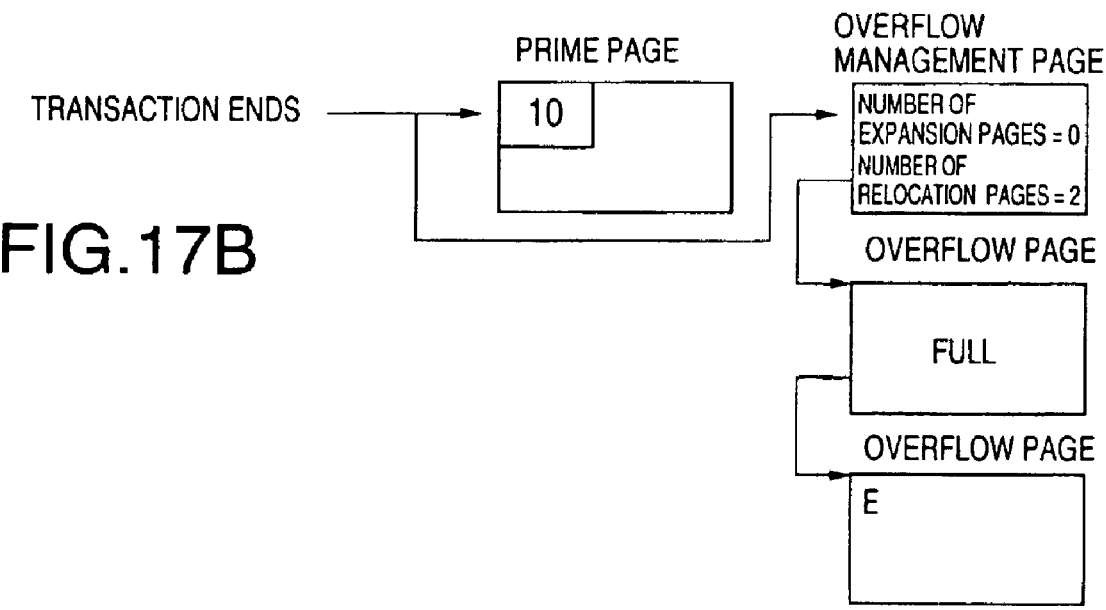

The overflow prediction management program 11 determines the case of this record operation (the case of adding a record of a record length longer than a space produced by deleting a record) in this transaction so as to determine that the NDB 4 is in condition to have page relocation. Then, as shown in FIG. 17B, the overflow prediction management program 11 sets the value of the prediction management information 400 of the prime page to "10 (RELOCATABLE)", and sets the numbers of expansion and relocation pages managed by the overflow management page 410 to "0" and "2", respectively. Thereafter, at the end of the transaction, the overflow prediction management program 11 writes the updated value of the prediction management information 400 and the updated numbers of expansion and relocation pages to the NDB 4 in the DASD.

Thus, the overflow prediction management program 11 detects the numbers of expansion and relocation pages indicating the data storage condition of the NDB 4 from record operations in transactions.

As previously described in FIGS. 9 and 10, the overflow prediction management program 11 issues an instruction to perform page relocation in the NDB 4 or the expansion thereof based on the predicted data storage condition of the NDB 4.

The present invention is not limited to the specifically disclosed embodiment, but variations and modifications may be made without departing from the scope of the present invention.

The present application is based on Japanese priority application No. 2000-288116 filed on Sep. 22, 2000, the entire contents of which are hereby incorporated by reference.

What is claimed is:

1. A method of determining a timing for performing a relocation operation of data in a database or an expansion operation of the database, comprising the steps of:
    (a) determining whether a new overflow area is generated by a record operation;
    (b) determining whether fragmentation is generable in a prime area or overflow areas including the new overflow area linked thereto by the record operation if it is determined in said step (a) that the new overflow area is generated;
    (c) computing a number of relocatable areas and a number of areas in an expansion direction based on a result of said step (b); and
    (d) determining the relocation operation timing or the expansion operation timing with respect to the database based on a rate of use of the overflow areas computation computed from a ratio of relocatable overflow areas to the overflow areas and a ratio of overflow areas in the expansion direction to the overflow areas.

2. An apparatus for determining a timing for performing a relocation operation of data in a database or an expansion operation of the database, comprising:
    a first determination part configured to determine whether a new overflow area is generated by a record operation;
    a second determination part configured to determine whether fragmentation is generable in a prime area or overflow areas including the new overflow area linked thereto by the record operation if it is determined by said first determination part that the new overflow area is generated;
    a computation part configured to compute a number of relocatable areas and a number of areas in an expansion direction based on a determination result of said second determination part; and
    a determination part configured to determine the relocation operation timing or the expansion operation timing with respect to the database based on a rate of use of the overflow areas computed from a ratio of relocatable overflow areas to the overflow areas and a ratio of overflow areas in the expansion direction to the overflow areas.

3. A recording medium storing:
    a program for causing a computer to execute a method of determining a timing for performing a relocation operation of data in a database or an expansion operation of the database, the method comprising the steps of:
    (a) determining a data storage condition of a database from a record operation;
    (b) computing a number of relocatable areas and a number of areas in an expansion direction based on the data storage condition determined in said step (a); and
    (c) determining the relocation or the expansion operation timing with respect to the database based on a rate of use of overflow areas computed from a ratio of relocatable overflow areas to the overflow areas and a ratio of overflow areas in the expansion direction to the overflow areas.

4. The recording medium as claimed in claim 3, wherein said step (a) determines the data storage condition of the database based on a record operation type and a record length.

5. The recording medium as claimed in claim 3, wherein said step (c) determines the operation timing for page relocation in the database or capacity expansion of the database.

6. A recording medium storing:
    a program for causing a computer to execute a method of determining a timing for performing a relocation operation of data in a database or an expansion operation of the database, the method comprising the steps of:
    (a) determining whether a new overflow area is generated by a record operation;
    (b) determining whether fragmentation is generable in a prime area or overflow areas including the new overflow area linked thereto by the record operation if it is determined in said step (a) that the new overflow area is generated;
    (c) computing a number of relocatable areas and a number of areas in an expansion direction based on a result of said step (b); and
    (d) determining the relocation operation timing or the expansion operation timing with respect to the database based on a rate of use of the overflow areas computed from a ratio of relocatable overflow areas to the overflow areas and a ratio of overflow areas in the expansion direction to the overflow areas.

7. The recording medium as claimed in claim 6, wherein said step (a) is performed with respect to each transaction.

8. The recording medium as claimed in claim 6, wherein said step (d) is performed if a new number of relocatable areas and a new number of areas in the expansion direction are computed in said step (c).

9. The recording medium as claimed in claim 6, wherein said step (b) defines the prime area and the overflow areas linked thereto as a set in determining whether the fragmentation is generable in the prime area or the overflow areas linked thereto by the record operation.

10. The recording medium as claimed in claim 9, wherein said step (b) determines the set to be a relocatable area if said step (b) determines that the fragmentation is generable in the set, or determines the set to be in the expansion direction if said step (b) determines that the fragmentation is not generable in the set.

11. The recording medium as claimed in claim 10, wherein once said step (b) determines the set to be the relocatable area, said step (b) continues to determine the set to be the relocatable area even if a new overflow page is generated in the set.

* * * * *